Oct. 23, 1962    A. J. INGOLIA    3,059,653
COMBINATION DISHWASHER, SINK, GARBAGE DISPOSAL, AND
CABINET STRUCTURE THEREFOR
Filed Oct. 4, 1961    6 Sheets-Sheet 1

INVENTOR.
Anthony J. Ingolia
BY
Lloyd M. Keighley
HIS ATTORNEY

Oct. 23, 1962 A. J. INGOLIA 3,059,653
COMBINATION DISHWASHER, SINK, GARBAGE DISPOSAL, AND
CABINET STRUCTURE THEREFOR
Filed Oct. 4, 1961 6 Sheets-Sheet 2

INVENTOR.
Anthony J. Ingolia
BY Lloyd M. Keighley
HIS ATTORNEY

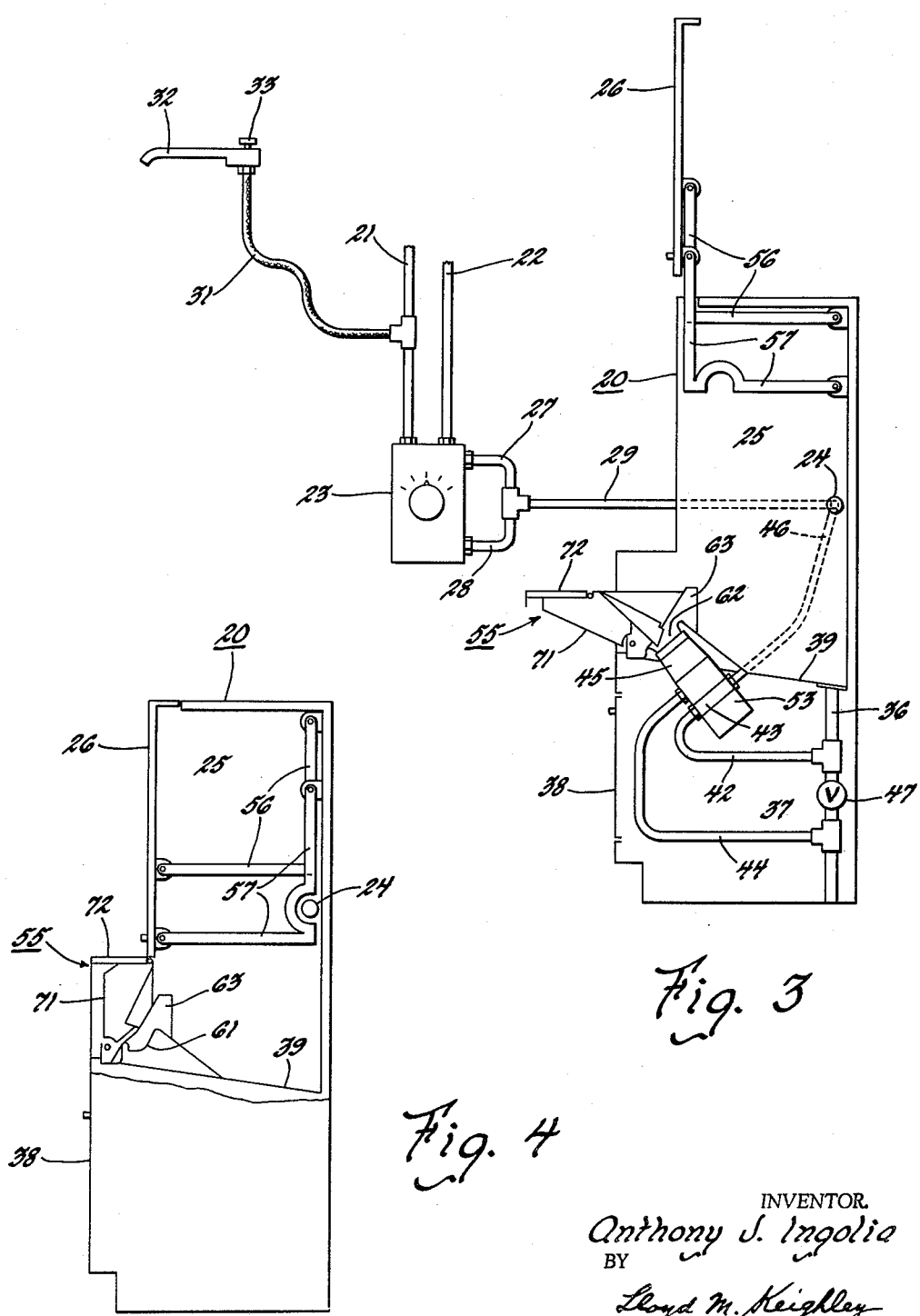

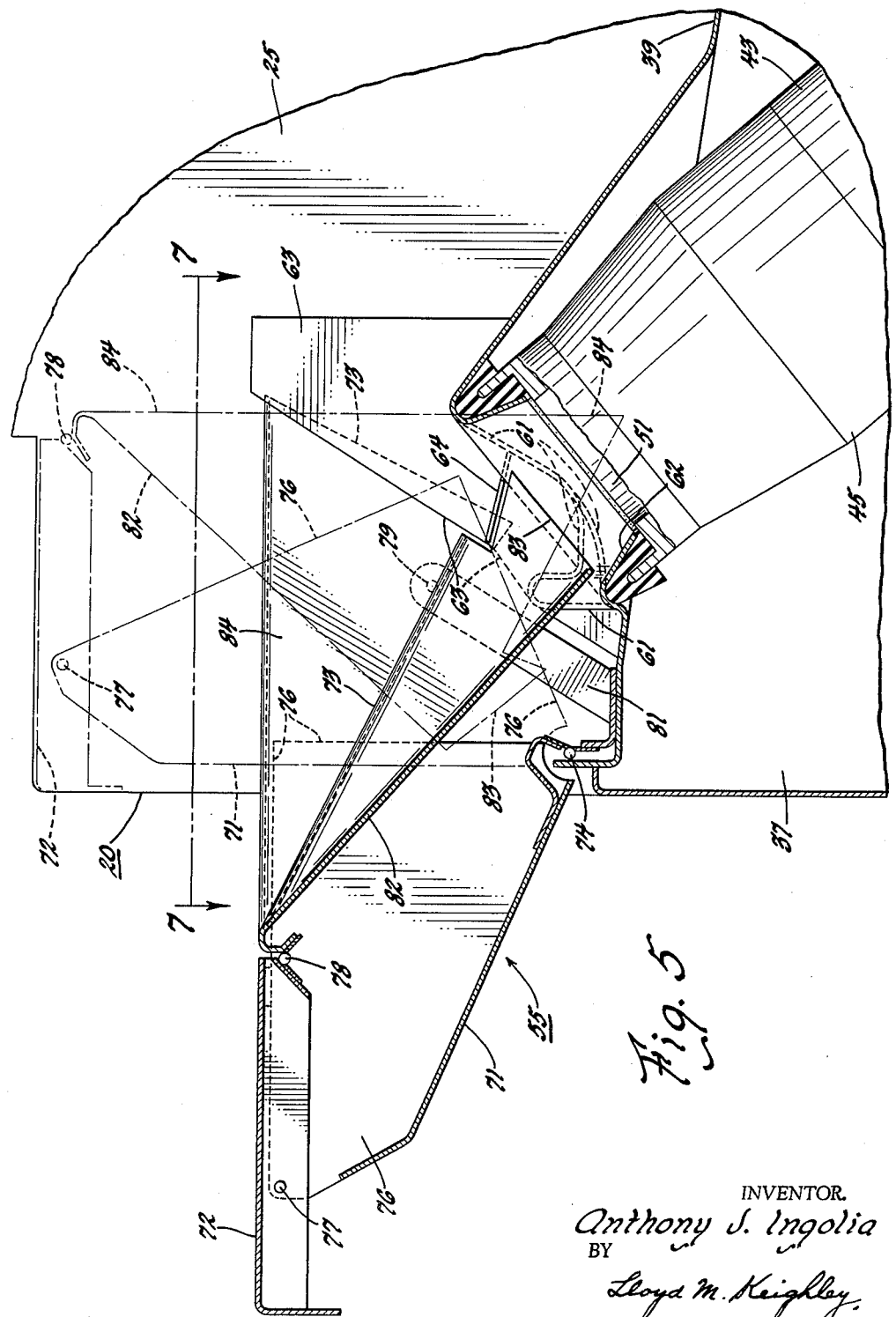

Oct. 23, 1962 A. J. INGOLIA 3,059,653
COMBINATION DISHWASHER, SINK, GARBAGE DISPOSAL, AND
CABINET STRUCTURE THEREFOR
Filed Oct. 4, 1961 6 Sheets-Sheet 5

INVENTOR.
Anthony J. Ingolia
BY
Lloyd M. Keighley
HIS ATTORNEY

Oct. 23, 1962 A. J. INGOLIA 3,059,653
COMBINATION DISHWASHER, SINK, GARBAGE DISPOSAL, AND
CABINET STRUCTURE THEREFOR
Filed Oct. 4, 1961 6 Sheets-Sheet 6

INVENTOR.
Anthony J. Ingolia
BY Lloyd M. Keighley
HIS ATTORNEY

United States Patent Office 3,059,653
Patented Oct. 23, 1962

3,059,653
COMBINATION DISHWASHER, SINK, GARBAGE DISPOSAL, AND CABINET STRUCTURE THEREFOR
Anthony J. Ingolia, St. Clair Shores, Mich., assignor to General Motors Corporation, Detroit, Mich., a corporation of Delaware
Filed Oct. 4, 1961, Ser. No. 142,811
11 Claims. (Cl. 134—89)

This invention relates to a domestic appliance and particularly to a unitary cabinet structure for installation in a kitchen for association with an elevated work ledge, counter top cabinets and over-the-work-ledge type cabinets or cupboards therein.

It is a primary object of my invention to localize necessary equipment for lessening a housewife's task of cleaning, washing and storing tableware such as dishes and the like and/or cooking utensils after the serving of a meal.

Another object of my invention is to provide a unitary kitchen cabinet appliance of a combined character having a sink, a flexible shiftable or extensible hose associated with the sink and a dishwashing chamber in the cabinet which unit reduces to a minimum steps to be taken by a housewife about the kitchen in preparing dishes or culinary containers for cleaning and washing in the appliance.

A further object of my invention is to group or compact various usually separated, widely spaced-apart elements required to individually prepare soiled dishes or the like for washing in a unitary kitchen cabinet structure or dishwasher which structure is of such size and configuration that when installed in a kitchen it will blend and cooperate with other cabinets or work ledges permanently built therein to provide a symmetrical arrangement thereof.

A still further object of my invention is to provide a unitary dishwasher cabinet structure including an upper dishwashing chamber and a compartment therein below the chamber which compartment includes a movable top wall portion projecting forwardly beyond the front of the chamber to provide a transfer ledge on the cabinet at a height equal to or flush with an elevated work ledge in a kitchen and forming a continuation of this ledge across the front of the cabinet for aiding in shifting tableware from one to the other side of the washer structure during preparation of a meal and/or during the act of rearranging and preparing dishes to be washed in the dishwasher.

In carrying out the foregoing objects it is a more specific object of my invention to provide a unitary cabinet structure having combined therein a dishwashing chamber, a sink for precleaning extraordinarily soiled dishes prior to washing them in the chamber, a flexible shiftable hose associated with the sink to aid in precleaning the dishes and a garbage disposer or comminutor connected to the drain outlet of the sink and to a drain pipe leading from the cabinet to a sanitary sewer conduit system so that all operations of cleaning, washing and storing tableware after finishing the serving of a meal can be carried out at a localized point in the kitchen.

Further objects and advantages of the present invention will be apparent from the following description, reference being had to the accompanying drawings wherein a preferred embodiment of the present invention is clearly shown.

In the drawings:

FIGURE 3 is a diagrammatic view through the structure illustrating sink forming means and a plumbing system incorporated therein;

FIGURE 4 is a view similar to FIGURE 3 showing sink and dishwashing chamber closure means of the structure in closed position;

FIGURE 5 is an enlarged fragmentary sectional view taken along the lines 5—5 of FIGURE 1 showing a sink in the front portion of the unitary cabinet structure at its drain outlet and illustrating a closure device on the cabinet in open position;

Figure 8:
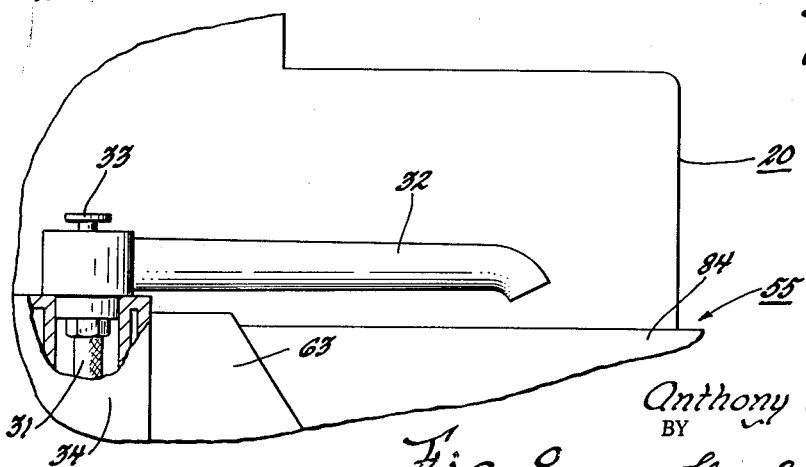
Figure 7:
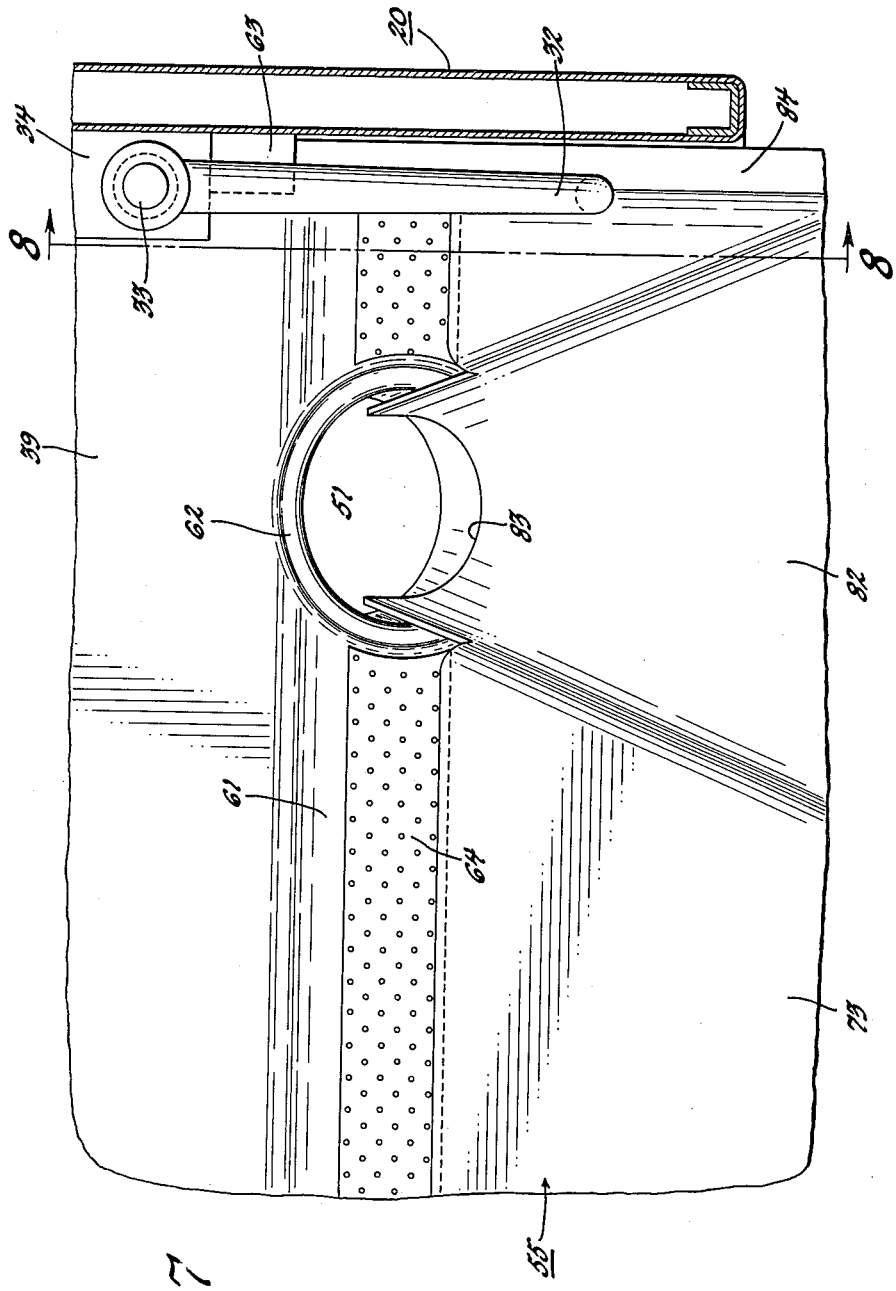

FIGURE 7 is a fragmentary sectional view taken along the lines 7—7 of FIGURE 5 showing the drain outlet side of the sink in the cabinet structure and the location of a shiftable hose provided with a water discharge nozzle thereon associated with the sink; and FIGURE 8 is a fragmentary sectional view taken along the lines 8—8 of FIGURE 7 illustrating the hose and its nozzle mounted in a receptacle provided within the unitary cabinet structure.

Figure 1:
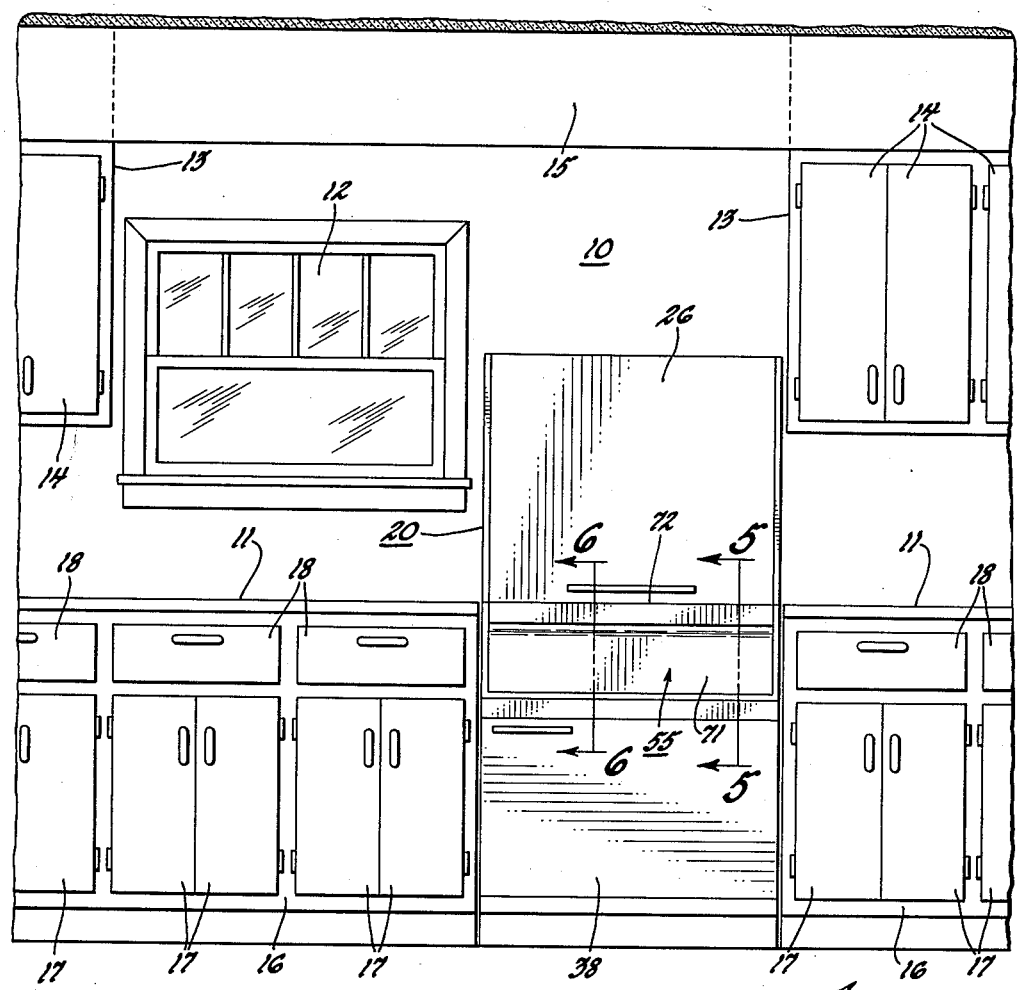
FIGURE 1 is a view of a kitchen wall having cabinets, cupboards and work ledges elevated above the kitchen floor and showing a combined unitary cabinet structure associated therewith constructed in accordance with my invention.

Referring to the drawings, for illustrating my invention, there is shown in FIGURE 1 thereof one wall portion 10 of a kitchen having elevated work ledges or counters 11 therein along wall 10 which has a window 12 in this wall and cabinets or cupboards 13 mounted thereon above a ledge 11 provided with the doors 14. The window 12 and cupboards 13 may be located below a false ceiling part or soffit 15 in the kitchen containing suitable overhead illuminating lights. Cabinets 16 provided with doors 17 and sliding drawers or the like 18 are mounted along wall portion 10 below the work ledge 11. A unitary cabinet structure or dishwashing machine, generally represented by the reference numeral 20 is located in the kitchen against its wall 10 adjacent a work ledge 11 and preferably intermediate two such ledges. The kitchen at this location is provided with a suitable fixed inlet of a sewer conduit (not shown) leading from the residence to a sanitary underground sewer drain system and hot and cold water plumbing pipes 21 and 22 respectively (see FIGURE 3) are connected with sources of water supply under pressure as is conventional in the art. Pipes 21 and 22 lead to a timer or timed water mixing valve or control 23 for regulating both the flow and temperature of water entering a water spraying element or tube 24 mounted in a dishwashing chamber 25 of the cabinet structure, having its front access opening closed by a door 26, by way of pipes 27 and 28 and a pipe 29. A flexible extendible or shiftable hose 31, having a water discharge nozzle 32 controlled by a hand or finger operated push valve 33 attached to the outlet end thereof, within a front portion of chamber 25 (see FIGURES 7 and 8) is connected to the source of hot water supply or pipe 21. Nozzle 32 of hose 31 is movably supported in a suitable socket-like receptacle 34 secured within structure 20 at the front of and adjacent one side of chamber 25 therein. The hose 31 and nozzle 32 are similar to that ordinarily incorporated in a kitchen sink and therefore need no further description herein. A drain pipe 36 (see FIGURE 3) within a compartment 37, closed by a lower door 38, below the washing chamber 25 in unitary cabinet structure 20 communicates with the bottom wall 39 of this chamber. Compartment 37 has an upper portion thereof offset or projecting forwardly of the front of chamber 25 for a purpose to be hereinafter described. Drain pipe 36 has two pipes connected therewith, the one 42 of which leads to an inlet side of a water pump 43 and the other pipe 44 connected therewith leads from the outlet side of a garbage or food waste disposer or comminutor 45 mounted in any suitable or conventional fashion within compartment 37. A pipe 46 leads from the discharge side of pump 43 to the inlet of water spraying element or tube 24. An automatically actuated solenoid or the like valve 47 is interposed in drain pipe 36 intermediate pipe connections 42 and 44 therewith for a purpose to be hereinafter described. Comminutor 45 may be of any suitable or desirable construction and is provided with an inlet 51 (see FIGURE 5) leading to a shredder or grinding element therein for comminuting or grinding food waste material into particles of such size as to be discharged along with water therefrom through pipe 44 and drain pipe 36 to the sewer conduit. An electric motor 53 has a shaft (not shown) connected to both the water pump 43 and the grinding element of comminutor 45. The elements just described are all included in the construction of the unitary cabinet or dishwashing machine 20 and constitute a self-contained plumbing system which is connected to the sanitary drain conduit leading from the kitchen underground away from the residence. This plumbing system with an electric circuit (not shown) for valves within control 23, valve 47 and motor 53, together with the motor operating both pump 43 and comminutor 45, may insofar as this invention is concerned be conventional and can, for example, be similar to that shown and more fully described in the patent to William Smith, Jr., No. 2,729,219, dated January 3, 1956, and assigned to the assignee of this application.

Figure 2:
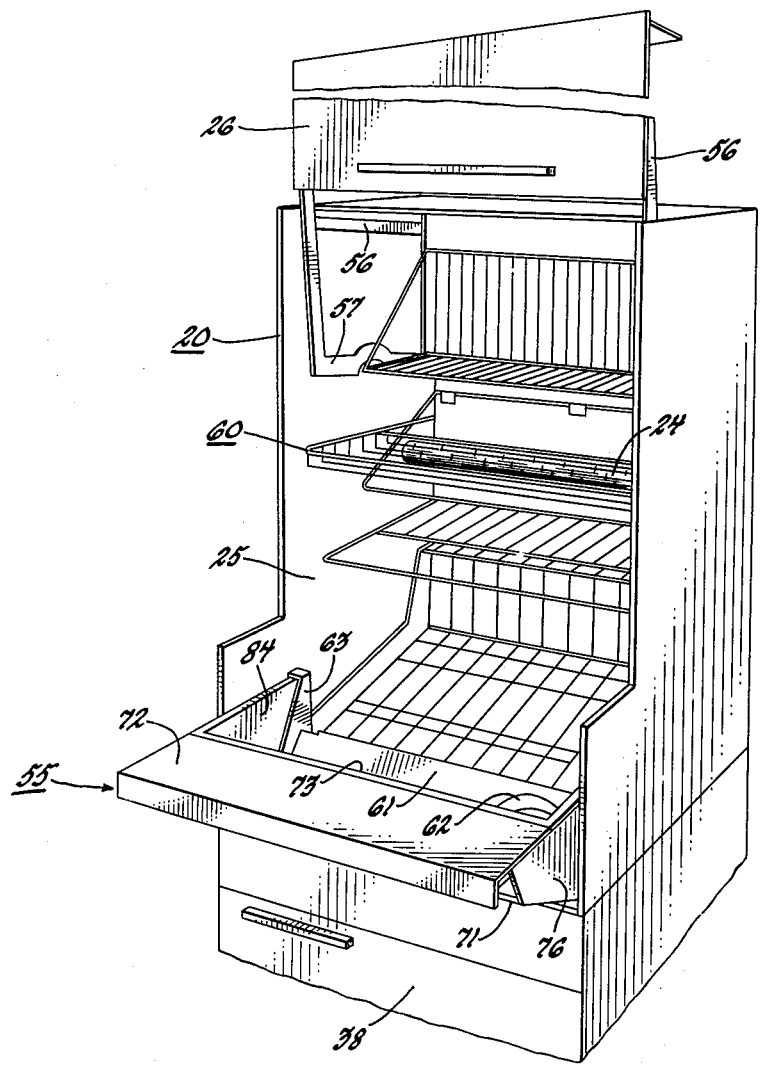
FIGURE 2 is a fragmentary perspective view of the unitary cabinet structure with closure means thereon opened and showing a dishwashing chamber therein provided with dish supporting racks.
Figure 6:
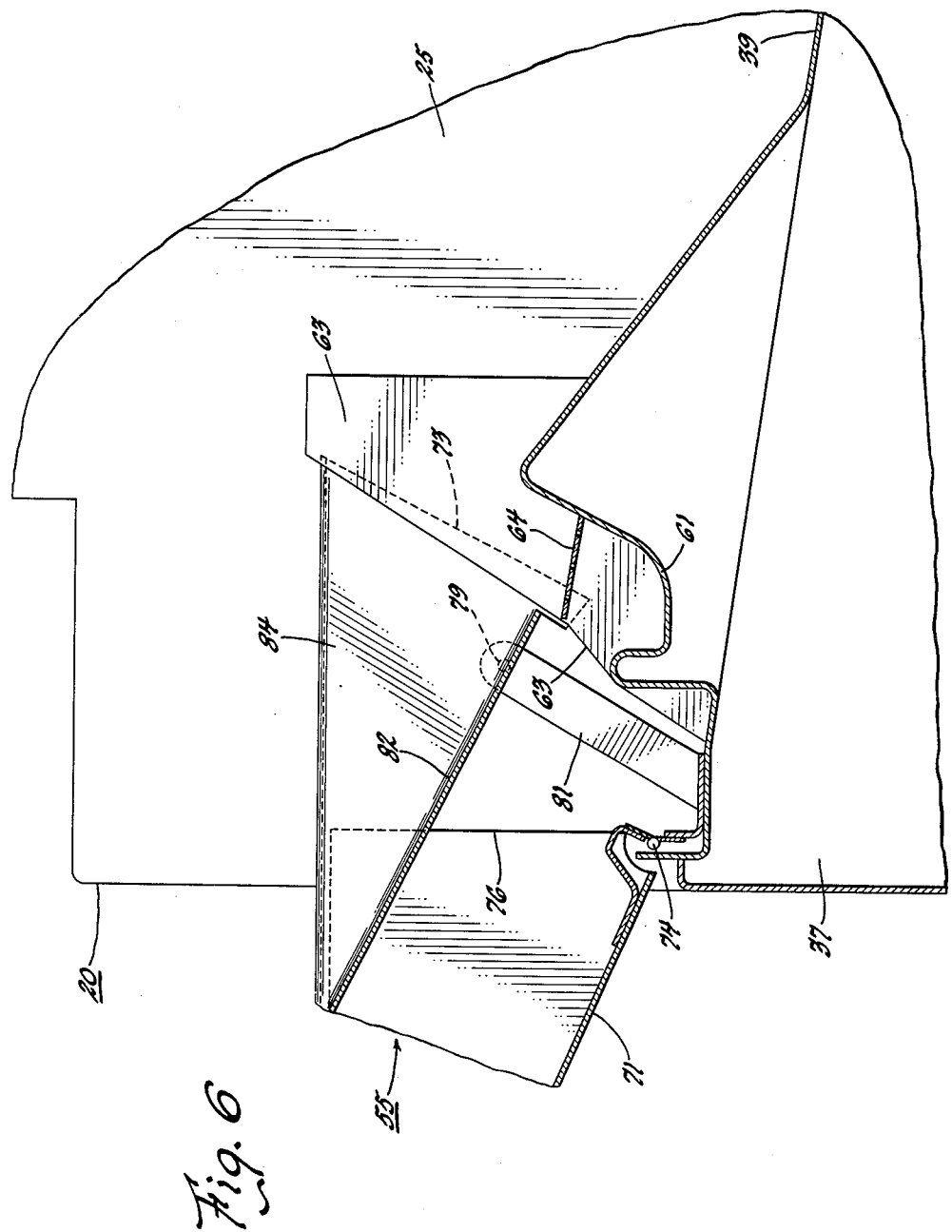
FIGURE 6 is a view taken along the lines 6—6 of FIGURE 1 similar to FIGURE 5 showing a portion of the sink beyond or spaced from its drain outlet.

In accordance with my invention the unitary cabinet structure 20 comprises a suitable rigid frame (not shown) enclosed by a sheet metal shell or wall providing the dishwashing chamber 25 therein and the compartment 37 therebelow. Chamber 25 is preferably bounded by double metal walls having suitable insulating material disposed therebetween as is conventional in the dishwasher cabinet art. The dishwashing chamber 25 extends upwardly in structure 20 a substantial distance above a work ledge 11 in the kitchen and its bottom wall 39 forms a drain pan-like top wall of compartment 37. Compartment 37 is offset forwardly of the front of chamber 25 and has its lower front opening closed by the door 38 which is vertically hinged to the structure 20. The forwardly projected offset upper portion of compartment 37 is normally closed by a movable sectional closure device or compartment top wall part generally indicated at 55. Wall sections of device 55 provide outer walls of structure 20. The horizontal top of wall portion or sectional closure device 55 of structure 20 is at the level of the elevated work ledge 11 in the kitchen and provides a continuation of this ledge across the front of the unitary cabinet construction to serve, in conjunction with the ledge, as a rearranging shelf on the cabinet for facilitating transfer of pots, pans, dishes, etc. from one side to the other side of the structure. Dishwashing chamber 25 has its front access opening normally closed by the outwardly and upwardly swingable door 26 secured to the structure 20 by levers 56 and 57 pivotally anchored therein at sides thereof. The water spraying element is horizontally located in chamber 25 and is in the form of a perforated tube substantially coextensive with a dish supporting rack means generally indicated at 60 within the dishwashing chamber (see FIGURE 2). This rack means may be a single unit or a plurality of separate cooperating units provided with vertically tiered wire portions shaped or designed to support tableware such as cups, saucers, plates, bowls, etc. Insofar as the present invention is concerned the rack means 60 can be mounted in dishwashing chamber 25, behind door 26, in any suitable or conventional fashion so as to receive and support dishes or the like in spaced-apart relationship thereon in close proximity to spray element 24 to be effectively washed by water sprayed therefrom into chamber 25. A sheet metal member, which is preferably porcelain enamel, is stationarily mounted in structure 20 at the lower front part of chamber 25 within the upwardly forwardly projecting or offset portion of compartment 37. This stationary member is adapted to provide a complemental part of a sink forming means in structure 20 within the upper front portion of compartment 37 and includes an elongated basin 61 extending across the front of chamber 25 (see FIGURES 2, 5, 6 and 7) having funnel-like outlet 62 formed therein communicating with the inlet 51 of comminutor 45. This sheet metal member also includes upright arms 63 spaced inwardly from and secured to side walls of the cabinet structure 20. Basin 61 preferably slopes or is inclined downwardly from side walls of cabinet 20 toward its outlet 62 so as to drain water thereinto and perforated plates or screens 64 are welded or otherwise stationarily secured to basin 61. Plates or screens 64 on basin 61 terminate closely adjacent its outlet 62. The complemental sink forming sheet metal member may be separate from bottom wall 39 of chamber 25, if desired, and welded or otherwise suitably secured thereto but is preferably an integral part of that wall, as shown.

Movable sectional closure device 55 normally closes the forwardly projecting upper portion of compartment 37 to conceal the sink forming means and the shiftable hose 31, having the nozzle 32 thereon, within the unitary cabinet structure 20. Device 55 comprises a panel 71, that normally provides an outer front wall of the cabinet closing the upper forward part of compartment 37, a work ledge panel 72 that normally provides an outer wall of the cabinet closing the top forward part of compartment 37 to form a continuation of work ledge 11 across the front of cabinet 20, and an innerpan-like member 73 carried by the device as shown in FIGURES 1 and 4 and by the dot-dash lines in FIGURE 5 of the drawings. Front panel 71 is swingably mounted on structure 20 as by a piano-like hinge 74 (see FIGURE 5) and has sides 76 which are pivotally connected by pins or rivets 77 to downwardly flanged side parts of the work ledge panel 72. Panel 72 is pivotally connected to inner member 73 by a piano-like hinge 78 and this inner member 73 is pivotally anchored within and at sides of the structure 20 by pins 79 carried on support brackets 81 located on each side of the sectional device 55. These panels 71 and 72 and member 73 are interlocked together so that these sections of the sectional closure wall or device 55 are movable in unison relative to one another when the device is swung open with respect to cabinet structure 20. As before stated, the sections or panels 71 and 72 are normally in the position shown by dot-dash lines in FIGURE 5 or as shown in FIGURES 1 and 4 of the drawings to close the upper front portion of compartment 37 and provide outer walls of cabinet structure 20. Pan-like member 73 is carried on the inside of device 55 and is adapted to cooperate with the stationary member, basin 61 and plate 64 to provide a second complemental part of a sink or a sink forming means within the unitary structure in front of the lower portion of dishwashing chamber 25 therein. An angularly arranged depressed portion 82 is provided in member 73 and has a curved lip part 83 extending beyond the lower edge thereof into the drain outlet 62 of the basin member 61 when device 55 is opened and while members 61 and 73 are in cooperative relationship (see FIGURES 5, 6 and 7). Member 73 is also provided with sides 84 which are movable therewith within the space between side walls of structure 20 and walls of upright arms 63 of stationary basin member 61.

When it is desired to employ the domestic appliance herein disclosed for precleaning soiled dishes, washing and storing them therein after the serving of a meal the user grasps a handle on door 26 and moves this door outwardly and upwardly with respect to the unitary cabinet structure 20. Door 26 swings about the pivot points of lever arms 56 and 57 to open the front access opening of dishwashing chamber 25 and comes to rest in a vertical position above cabinet 20 (see FIGURES 2 and 3). The housewife or user of the appliance then applies a forward force to horizontal wall or panel 72 of device 55, which forms the continuation of kitchen work ledge 11, to swing this device into a supported open position outwardly of the front of a lower portion of chamber 25 to expose the shiftable flexible hose to the exterior of cabinet 20 and to movable member 73 into cooperative relationship with stationary member or basin 61 to form a sink in the forward part of chamber 25 at the upper offset portion of compartment 37. In other words, parts of device 55 are shifted from the dot-dash line position to the full line position thereof as seen in FIGURE 5 of the drawings. During this manual shifting of device 55 panel 72 moves forwardly and downwardly relative to cabinet structure 20 about its interlocked pivotal connection 77 with panel 71 and hinged connection 78 with member 73 and consequently panel 71 swings about its hinged mounting 74 on the cabinet and member 73 swings about its pivotal mounting 79 thereon. In this shifted position of device 55 lip part 83 of depression 82 on member 73 has moved into registration with drain outlet 62 and member 73 cooperates with the stationary basin member 61 to form complementary parts of a sink at the front of chamber 25. The panel 72 is supported in a horizontal position and provides a substantially waist-high work ledge adjacent the front of the sink. Dishes such as plates, saucers, cups and bowls or the like that are extraordinarily soiled or contain an excessive amount of waste food material which must be disposed of prior to being washed are carried to the sink in cabinet structure 20 and received therein. A soiled dish is placed in the depressed portion 82 of the sink and the nozzle 32 is raised out of its receptacle 34, to shift or extend flexible hose 31 therefrom, and the nozzle is then moved into juxtaposition with that individual dish. Valve 33 at the end of hose 31 is then opened to emit water from nozzle 32 which flushes the waste material off the soiled dish directly into cabinet 20 to the drain outlet 62 and inlet 21 of the comminutor 45. This act is completed at the front of structure 20 and does not require additional steps to be taken by a housewife in transferring soiled dishes from a kitchen sink to a dishwasher cabinet located remotely therefrom. The precleaned dish is thereafter placed in chamber 25 upon the dish rack supporting means 60 therein. This operation is repeated until all of the extraordinarily soiled dishes have been precleaned and put into chamber 25 along with other less soiled dishes placed therein. Control 23 and the electrical system associated therewith and with other elements of the washing machine may be of such character that motor 53 of comminutor 45 can be energized at the start of precleaning dishes even though no wash water is yet emitted to spray element 24, and therefore pump 43 operated simultaneously with the comminutor will be ineffective to pump water to spray dishes already placed in chamber 25. The garbage disposer or comminutor 45 grinds the waste food material into small particles of such size that they are discharged thereby along with water emitted from hose 31 out of cabinet structure 20 through pipes 44 and 36 respectively to the sewer underground conduit system. After disposal of excess waste food material dishes supported on rack means 60 within dishwashing chamber 25 are now to be thoroughly washed and cleaned. Therefore, the housewife or user of the washing machine 20 shifts device 55 back into its normal closed position and recloses door 26 of chamber 25. A knob on timer control 23 is then actuated or set to activate this control and cause a predetermined or measured amount of mixed or hot water to be discharged therefrom through pipe 29 and spray element 24 over the dishes and into the sump above bottom wall 39 of chamber 25. At the time of setting the knob on timer control 23 valve 47 is closed and motor 53 is again energized. Operation of motor 53 drives pump 43 and this pump circulates water, admitted to the washing chamber 25, from pipe 36 through pipes 42 and 46 back to the spray element 24 and this recirculation of the water over the dishes effectively cleanses same. Timer control 23 may be of a type to cause, after being once manually set, an automatic draining of contaminated wash water to the sewer conduit through valve 47 in pipe 36 and to thereafter close valve 47 and cause fresh water to be discharged from spraying element 24 for a final rinsing of dishes supported on rack means 60 in chamber 25 before the timer control becomes inactivated.

From the foregoing it should be apparent that I have provided a unitary domestic appliance or cabinet structure embodying a combined arrangement for disposing of excess waste food material removed from soiled dishes therein and for washing dishes therein after the serving of a meal. My unitary cabinet structure fits into the general or usual arrangements of other cabinets, a work ledge or the like within in a kitchen and cooperates therewith to provide a symmetrical plan thereof along a kitchen wall and moreover groups of compact equipment, that is required in the act of clearing soiled dishes from a dinner table, into a single unit whereby to reduce or minimize steps necessary to be taken by a housewife about the kitchen. In localizing activity of a housewife during the act of clearing a dinner table of soiled dishes, disposing of waste food material, facilitating washing and at least temporary storage and concealment of washed dishes or other utensils, the kitchen is quickly placed in an orderly state and the housewife is expediently released from such tasks as to have more time to entertain guests.

While the embodiment of the present invention as herein disclosed constitutes a preferred form, it is to be understood that other forms might be adopted.

What is claimed is as follows:

1. In combination, a unitary structure for installation in a kitchen adjacent an elevated work ledge therein, said structure comprising a cabinet provided with a dishwashing chamber extending above said work ledge and a compartment below said chamber, dish supporting rack means in said chamber, said chamber having a front opening controlled by a door affording access to said dish rack means, a drain pipe in said compartment communicating with the bottom of said chamber and extending outwardly from said cabinet to a sewer conduit, a dish spraying element within said chamber and a flexible shiftable hose therein connected to a source of water supply, a device movably mounted on said structure closing an upper forward portion of said compartment and providing an outer wall of said cabinet which forms a continuation of said elevated work ledge across the front thereof adjacent said chamber, sink forming means within said cabinet normally concealed by said device, said device being swingable relative to said unitary structure into a position thereon for opening the upper forward portion of said compartment to expose both said sink forming means and said hose to the exterior of said cabinet and for rendering said sink means usable at the front thereof in the vicinity of said work ledge, said sink means when rendered usable having its drain outlet communicating with said drain pipe, said sink means being adapted to receive extraordinarily soiled dishes for precleaning them therein prior to placing the dishes upon said rack means to be washed by said spraying element within said washing chamber, and said exposed hose being movable along said sink means into juxtaposition with individual dishes received therein whereby water emitted from the hose flushes waste material off the soiled dishes directly into said cabinet through the sink outlet to said drain pipe and said sewer conduit.

2. In combination, a unitary structure for installation in a kitchen adjacent an elevated work ledge therein, said structure comprising a cabinet provided with a dishwashing chamber extending above said work ledge and a compartment below said chamber, dish supporting rack means in said chamber, said chamber having a front opening controlled by a door affording access to said dish rack means, a drain pipe in said compartment communicating with the bottom of said chamber and extending outwardly from said cabinet to a sewer conduit, a comminutor in said compartment having an inlet and an outlet with said outlet thereof connected to said drain pipe, a dish spraying element within said chamber and a flexible shiftable hose therein connected to a source of water supply, a device movably mounted on said structure closing an upper forward portion of said compartment and providing an outer wall of said cabinet which forms a continuation of said elevated work ledge across the front thereof adjacent said chamber, sink forming means within said cabinet normally concealed by said device, said device being swingable relative to said unitary structure into a position thereon for opening the upper forward portion of said compartment to expose both said sink forming means and said hose to the exterior of said cabinet and for rendering said sink means usable at the front thereof in the vicinity of said work ledge, said sink means when rendered usable having its drain outlet communicating with the inlet of said comminutor, said sink means being adapted to receive extraordinarily soiled dishes for precleaning them therein prior to placing the dishes upon said rack means to be washed by said spraying element within said washing chamber, said exposed hose being movable along said sink means into juxtaposition with individual dishes received therein whereby water emitted from the hose flushes waste material off the soiled dishes directly into said cabinet to said inlet of the comminutor within said compartment, and said comminutor discharging water and the waste material comminuted thereby from said cabinet through said drain pipe to the sewer conduit.

3. In combination, a unitary structure comprising a cabinet provided with a dishwashing chamber and a compartment below said chamber, dish supporting rack means in said chamber, said chamber having an opening controlled by a door affording access to said dish rack means, a drain pipe in said compartment communicating with the bottom of said chamber and extending outwardly from said cabinet to a sewer conduit, a dish spraying element within said chamber and a flexible shiftable hose therein connected to a source of water supply, said compartment having an upper portion thereof offset with respect to said chamber at an elevated substantially work ledge height on said cabinet adjacent a lower portion of the chamber, a device movably mounted on said structure closing said upper portion of the compartment and providing an outer wall of said cabinet thereat, sink forming means within the upper portion of said compartment normally concealed by said device, said device being swingable relative to said unitary structure into a position thereon for opening said upper portion of the compartment to expose both said sink forming means and said hose to the exterior of said cabinet and for rendering the sink means usable, said sink means when rendered usable having its drain outlet communicating with said drain pipe, said sink means being adapted to receive extraordinarily soiled dishes for precleaning them therein prior to placing the dishes upon said rack means to be washed by said spraying element within said washing chamber, and said exposed hose being movable along said sink means into juxtaposition with individual dishes received therein whereby water emitted from the hose flushes waste material off the soiled dishes directly into said cabinet through the sink outlet to said drain pipe and said sewer conduit.

4. In combination, a unitary structure comprising a cabinet provided with a dishwashing chamber and a compartment below said chamber, dish supporting rack means in said chamber, said chamber having an opening controlled by a door affording access to said dish rack means, a drain pipe in said compartment communicating with the bottom of said chamber and extending outwardly from said cabinet to a sewer conduit, a comminutor in said compartment having an inlet and an outlet with said outlet thereof connected to said drain pipe, a dish spraying element within said chamber and a flexible shiftable hose therein connected to a source of water supply, said compartment having an upper portion thereof offset with respect to said chamber at an elevated substantially work ledge height on said cabinet adjacent a lower portion of the chamber, a device movably mounted on said structure closing said upper portion of the compartment and providing an outer wall of said cabinet thereat, sink forming means within the upper portion of said compartment normally concealed by said device, said device being swingable relative to said unitary structure into a position thereon for opening said upper portion of the compartment to expose both said sink forming means and said hose to the exterior of said cabinet and for rendering the sink means usable, said sink means when rendered usable having its drain outlet communicating with the inlet of said comminutor, said sink means being adapted to receive extraordinarily soiled dishes for precleaning them therein prior to placing the dishes upon said rack means to be washed by said spraying element within said washing chamber, said exposed hose being movable along said sink means into juxtaposition with individual dishes received therein whereby water emitted from the hose flushes waste material off the soiled dishes directly into said cabinet to said inlet of the comminutor within said compartment, and said comminutor discharging water and the waste material comminuated thereby from said cabinet through said drain pipe to the sewer conduit.

5. In combination, a unitary structure for installation in a kitchen adjacent an elevated work ledge therein, said structure comprising a cabinet provided with a dishwashing chamber extending above said work ledge and a compartment below said chamber having a portion thereof offset forwardly of the front of the chamber, dish supporting rack means in said chamber, said chamber having a front opening controlled by a door affording access to said dish rack means, a drain pipe in said compartment communicating with the bottom of said chamber and extending outwardly from said cabinet to a sewer conduit, a dish spraying element within said chamber and a flexible shiftable hose therein having an end thereof located in the vicinity of said offset portion of said compartment, said hose being connected to a source of water supply, a first member stationarily mounted in said structure adjacent the lower front part of said chamber, a device above the forwardly offset portion of said compartment pivotally mounted on said structure, said device including a cabinet outer wall normally closing said lower front part of said chamber and providing a continuation of said elevated work ledge across the front of said cabinet, a second member carried on the inner side of said device, said outer cabinet wall portion of said device normally concealing said members, said device being swingable about said pivotal mounting relative to said structure for opening said lower front part of the chamber to expose said hose and for moving said second member into cooperation with said first member, the cooperation of said members with one another forming a sink at the front of said chamber having its drain outlet communicating with said drain pipe, said sink being adapted to receive extraordinarily soiled dishes for precleaning them therein prior to placing the dishes upon said rack means to be washed by said spraying element within said washing chamber, and said exposed hose being movable along said sink into juxtaposition with individual dishes received therein whereby water emitted from the hose flushes waste material off the soiled dishes directly into said cabinet through the sink outlet to said drain pipe and said sewer conduit.

6. In combination, a unitary structure for installation in a kitchen adjacent an elevated work ledge therein, said structure comprising a cabinet provided with a dishwashing chamber extending above said work ledge and a compartment below said chamber having a portion thereof offset forwardly of the front of the chamber, dish supporting rack means in said chamber, said chamber having a front opening controlled by a door affording access to said dish rack means, a drain pipe in said compartment communicating with the bottom of said chamber and extending outwardly from said cabinet to a sewer conduit, a comminutor in said compartment having an inlet and an outlet with said outlet thereof connected to said drain pipe, a dish spraying element within said chamber and a flexible shiftable hose therein having an end thereof located in the vicinity of said offset portion of said compartment, said hose being connected to a source of water supply, a first member stationarily mounted in said structure adjacent the lower front part of said chamber, a device above the forwardly offset portion of said compartment pivotally mounted on said structure, said device including a cabinet outer wall normally closing said lower front part of said chamber and providing a continuation of said elevated work ledge across the front of said cabinet, a second member carried on the inner side of said device, said outer cabinet wall portion of said device normally concealing said members, said device being swingable about said pivotal mounting relative to said structure for opening said lower front part of the chamber to expose said hose and for moving said second member into cooperation with said first member, the cooperation of said members with one another forming a sink at the front of said chamber having its drain outlet communicating with the inlet of said comminutor, said sink being adapted to receive extraordinarily soiled dishes for precleaning them therein prior to placing the dishes upon said rack means to be washed by said spraying element within said washing chamber, the exposed end of said hose being movable along said sink into juxtaposition with individual dishes received therein whereby water emitted from the hose flushes waste material off the soiled dishes directly into said cabinet to said inlet of the comminutor within said compartment, and said comminutor discharging water and the waste material comminuted thereby from said cabinet through said drain pipe to the sewer conduit.

7. In combination, a unitary structure comprising a cabinet provided with a dishwashing chamber therein and a compartment below said chamber, said compartment having an upper portion thereof offset forwardly of said structure at an elevated substantially work ledge height thereon in front of the lower portion of said chamber, dish supporting rack means in said chamber, said chamber having an opening adjacent and above said upper offset portion of said compartment controlled by a door affording access to said dish rack means, a drain pipe in said compartment communicating with the bottom of said chamber and extending outwardly from said cabinet to a sewer conduit, a dish spraying element within said chamber and a flexible shiftable hose therein having an end thereof located in the vicinity of said upper offset portion of said compartment, said hose being connected to a source of water supply, a first member stationarily mounted in said structure within and extending across said upper portion of the compartment, a device movably mounted on said structure closing the upper forwardly offset portion of said compartment and providing an outer wall of said cabinet thereat, a second member within said structure coextensive with said first member therein carried by said device for movement therewith, said device normally concealing said members and when moved relative to said structure exposing said hose end and said first member to the exterior of said cabinet and moving said second member into cooperation with said first member, the cooperation of said members with one another forming a sink on said structure in front of said lower portion of said chamber, said sink having its drain outlet communicating with said drain pipe, said sink being adapted to receive extraordinarily soiled dishes for precleaning them therein prior to placing the dishes upon said rack means to be washed by said spraying element within said washing chamber, and the exposed end of said hose being movable along said sink into juxtaposition with individual dishes received therein whereby water emitted from the hose flushes waste material off the soiled dishes directly into said cabinet through the sink outlet to said drain pipe and said sewer conduit.

8. In combination, a unitary structure comprising a cabinet provided with a dishwashing chamber therein and a compartment below said chamber, said compartment having an upper portion thereof offset forwardly of said structure at an elevated substantially work ledge height thereon in front of the lower portion of said chamber, dish supporting rack means in said chamber, said chamber having an opening adjacent and above said upper offset portion of said compartment controlled by a door affording access to said dish rack means, a drain pipe in said compartment communicating with the bottom of said chamber and extending outwardly from said cabinet to a sewer conduit, a comminutor in said compartment having an inlet and an outlet with said outlet thereof connected to said drain pipe, a dish spraying element within said chamber and a flexible shiftable hose therein having an end thereof located in the vicinity of said upper offset portion of said compartment, said hose being connected to a source of water supply, a first member stationarily mounted in said structure within and extending across said upper portion of the compartment, a device pivotally mounted on said structure closing the upper forwardly offset portion of said compartment and providing an outer wall of said cabinet thereat, a second member within said structure coextensive with said first member therein carried by said device for movement therewith, said device normally concealing said members and when rotated about said pivotal mounting thereof relative to said structure exposing said hose end and said first member to the exterior of said cabinet and moving said second member into cooperation with said first member, the cooperation of said members with one another forming a sink on said structure in front of said lower portion of said chamber, said sink having its drain outlet communicating with the inlet of said comminutor, said sink being adapted to receive extraordinarily soiled dishes for precleaning them therein prior to placing the dishes upon said rack means to be washed by said spraying element within said washing chamber, the exposed end of said hose being movable along said sink into juxtaposition with individual dishes received therein whereby water emitted from the hose flushes waste material off the soiled dishes directly into said cabinet to said inlet of the comminutor within said compartment, and said comminutor discharging water and the waste material comminuted thereby from said cabinet through said drain pipe to the sewer conduit.

9. In combination, a unitary structure comprising a cabinet provided with a dishwashing chamber and a compartment below said chamber, dish supporting rack means in said chamber, said chamber having a front opening controlled by a door affording access to said dish rack means, a drain pipe in said compartment communicating with the bottom of said chamber and extending outwardly from said cabinet to a sewer conduit, a dish spraying element within said chamber and a flexible shiftable hose therein connected to a source of water supply, said compartment having an upper portion thereof offset forwardly of said chamber, sink forming means within the upper offset portion of said compartment, a sectional device movably mounted on said structure closing the upper offset portion of said compartment and concealing said hose and said sink forming means, one section of said device providing a vertical outer wall of the upper offset portion of said compartment and another section thereof providing a horizontal top wall of the upper offset portion of said compartment, said sectional device being swingable relative to said structure to expose said hose and said sink forming means to the exterior of said cabinet for use thereat, said another section of said device being moved by the swinging thereof into a supported position adjacent said sink forming means to provide an elevated work ledge at the front thereof, said sink forming means when so exposed having its drain outlet communicating with said drain pipe, said sink means being adapted to receive extraordinarily soiled dishes for precleaning them therein prior to placing the dishes upon said rack means to be washed by said spraying element within said washing chamber, and said exposed hose being movable along said sink means into juxtaposition with individual dishes received therein whereby water emitted from the hose flushes waste material off the soiled dishes directly into said cabinet through the sink outlet to said drain pipe and said sewer conduit.

10. In combination, a unitary structure comprising a cabinet provided with a dishwashing chamber and a compartment below said chamber, dish supporting rack means in said chamber, said chamber having a front opening controlled by a door affording access to said dish rack means, a drain pipe in said compartment communicating with the bottom of said chamber and extending outwardly from said cabinet to a sewer conduit, a comminutor in said compartment having an inlet and an outlet with said outlet thereof connected to said drain pipe, a dish spraying element within said chamber and a flexible shiftable hose therein connected to a source of water supply, said compartment having an upper portion thereof offset forwardly of said chamber, sink forming means within the upper offset portion of said compartment, a sectional device movably mounted on said structure closing the upper offset portion of said compartment and concealing said hose and said sink forming means, one section of said device providing a vertical outer wall of the upper offset portion of said compartment and another section thereof providing a horizontal top wall of the upper offset portion of said compartment, said sectional device being swingable relative to said structure to expose said hose and said sink forming means to the exterior of said cabinet for use thereat, said another section of said device being moved by the swinging thereof into a supported position adjacent said sink forming means to provide an elevated work ledge at the front thereof, said sink forming means when so exposed having its drain outlet communicating with the inlet of said comminutor, said sink means being adapted to receive extraordinarily soiled dishes for precleaning them therein prior to placing the dishes upon said rack means to be washed by said spraying element within said washing chamber, said exposed hose being movable along said sink means into juxtaposition with individual dishes received therein whereby water emitted from the hose flushes waste material off the soiled dishes directly into said cabinet to said inlet of the comminutor within said compartment, and said comminutor discharging water and waste material comminuted thereby from said cabinet through said drain pipe to the sewer conduit.

11. In combination, a unitary structure comprising a cabinet provided with a dishwashing chamber and a compartment therein below said chamber, dish supporting rack means in said chamber, said chamber having an opening controlled by a door affording access to said dish rack means, a dish spraying element within said chamber, a drain pipe in said compartment communicating with said chamber and extending outwardly from said cabinet to a sewer conduit, said compartment having an upper front portion adjacent a lower part of said chamber elevated at substantially a work ledge height on said cabinet, a device movably mounted upon said structure closing said upper front portion of the compartment and providing an outer wall of said cabinet thereat, sink forming means within the upper front portion of said compartment normally concealed by said device, a spray nozzle separate and spaced from said dish spraying element associated with said sink forming means also normally concealed within said cabinet by said device, said spray nozzle and said spraying element being connected to a source of water supply, said device being shiftable relative to said unitary structure from its closed position into a position to open said upper portion of the compartment for exposing both said sink forming means and said spray nozzle to the exterior of said cabinet for use at the front thereof, said sink means when so exposed having its drain outlet communicating with said drain pipe, said sink means being adapted to receive extraordinarily soiled dishes for precleaning them therein prior to placing the dishes upon said rack means to be washed by said spraying element within said washing chamber, and said spray nozzle being rendered effective independent of said spraying element while said sink means is usable whereby water emitted from the nozzle flushes waste material off the soiled dishes directly into said cabinet through the sink outlet to said drain pipe and said sewer conduit.

References Cited in the file of this patent

UNITED STATES PATENTS

| | | |
|---|---|---|
| 2,328,129 | Earle | Aug. 31, 1943 |
| 2,813,534 | Low | Nov. 19, 1957 |
| 2,852,030 | Nord | Sept. 16, 1958 |